(12) United States Patent
Juchauld et al.

(10) Patent No.: US 9,464,575 B2
(45) Date of Patent: Oct. 11, 2016

(54) IGNITION DEVICE AND METHOD FOR A TURBOMACHINE COMBUSTION CHAMBER

(75) Inventors: Etienne Juchauld, Samois sur Seine (FR); Jean-Pierre Badinier, Juvisy (FR); Jean Pierre Roberdeau, Boissie le Roi (FR); Marc Serrau, Cesson (FR)

(73) Assignee: SNECMA, Paris (FR)

( * ) Notice: Subject to any disclaimer, the term of this patent is extended or adjusted under 35 U.S.C. 154(b) by 375 days.

(21) Appl. No.: 14/240,889

(22) PCT Filed: Aug. 22, 2012

(86) PCT No.: PCT/FR2012/051918
§ 371 (c)(1),
(2), (4) Date: Feb. 25, 2014

(87) PCT Pub. No.: WO2013/030493
PCT Pub. Date: Mar. 7, 2013

(65) Prior Publication Data
US 2014/0216052 A1  Aug. 7, 2014

(30) Foreign Application Priority Data

Aug. 26, 2011  (FR) ...................................... 11 57564

(51) Int. Cl.
*F02C 7/264* (2006.01)
*F23Q 3/00* (2006.01)
*F02C 7/266* (2006.01)

(52) U.S. Cl.
CPC ............... *F02C 7/264* (2013.01); *F02C 7/266* (2013.01); *F23Q 3/002* (2013.01); *F23Q 3/008* (2013.01); *F23R 2900/00* (2013.01)

(58) Field of Classification Search
CPC ........ F02C 7/264; F02C 7/266; F23Q 3/008; F23Q 3/002; F23R 2900/00; F02P 3/12; F02P 13/00; F02P 23/00; F02M 57/06; H01T 13/40
USPC ...... 431/267–277, 43, 297, 151, 152, 169 V, 431/146.5 C, 143 B; 361/260
See application file for complete search history.

(56) References Cited

U.S. PATENT DOCUMENTS

| 4,766,721 | A | 8/1988 | Iizuka et al. |
| 6,199,365 | B1 * | 3/2001 | Pretorius ................. F02C 7/264 60/776 |
| 6,446,426 | B1 | 9/2002 | Sweeney et al. |
| 8,757,129 | B1 * | 6/2014 | Hill .......................... F02B 31/04 123/297 |

FOREIGN PATENT DOCUMENTS

| EP | 0 222 173 | 5/1987 |
| GB | 1 038 490 | 8/1966 |
| GB | 1 591 508 | 9/1977 |
| WO | 01 84061 | 11/2001 |

OTHER PUBLICATIONS

International Search Report Issued Oct. 11, 2012 in PCT/FR12/051918 Filed Aug. 22, 2012.

* cited by examiner

*Primary Examiner* — David Bryant
*Assistant Examiner* — Lawrence Averick
(74) *Attorney, Agent, or Firm* — Oblon, McClelland, Maier & Neustadt, L.L.P.

(57) ABSTRACT

A method and device for igniting a turbomachine combustion chamber including alternately: an intake phase of a fluid into a chamber through an intake port, during which a piston compresses an elastic mechanism under pressure of the fluid such that the elastic mechanism applies onto a piezoelectric element a force sufficient for the piezoelectric element to induce between the electrodes an electric voltage enabling an electric arc to be generated, until the piston reaches a predetermined position for closing a valve for sealing the intake port; and an exhaust phase of the fluid, during which the elastic mechanism pushes back the piston to induce a fluid ejection out of the chamber through an exhaust port, and the valve is open.

10 Claims, 4 Drawing Sheets

IGNITION DEVICE AND METHOD FOR A TURBOMACHINE COMBUSTION CHAMBER

TECHNICAL FIELD

The present invention relates to the ignition of combustion chambers in turbomachines, in particular aircraft turbomachines such as turbojet engines and turboprop engines of airplanes.

The invention relates in particular to an ignition device for a turbomachine combustion chamber, comprising two electrodes forming an ignition plug, and a module for electrically powering these electrodes.

It also relates to a combustion chamber equipped with such a device, a turbomachine comprising a combustion chamber of this type, as well as a method for igniting such a combustion chamber.

STATE OF PRIOR ART

FIG. 1 represents a simplified example of an aircraft turbomachine 10 of a known type, comprising, from upstream to downstream along the general gas flow direction, a compressor 12, a combustion chamber 14, and a turbine 16 designed to drive the compressor 12 through a common shaft 18 under the effect of the thrust of gases from the combustion chamber 14, in a well-known manner.

The combustion chamber 14 illustrated in FIG. 1 is of the annular type, but the present invention is of course applicable to other types of combustion chambers, as will appear more clearly in the following.

Such a combustion chamber 14 includes fuel injectors 20 circumferentially distributed around the axis 22 of the combustion chamber, and air feed means, for forming a sheet of a gas mixture of air and fuel within the chamber, as well as at least one ignition plug 24 to cause the ignition of this gas mixture.

The ignition plug 24 is generally mounted on an outer case 26 bounding an enclosure 28 wherein the combustion chamber 14 is accommodated. More precisely, the ignition plug 24 has an end 30 provided with two electrodes intended to generate an electric arc under the effect of an electric voltage provided by an electric power module 32. The plug 24 usually passes through a port provided in a radially outer wall 34 of the combustion chamber such that the end 30 of the plug is flush with the wall 34 or, as in the example illustrated in FIG. 1, projects inside the chamber away from the wall 34. Generally, the end 30 of the plug is such that it intercepts the air and fuel sheet 36 from a particular fuel injector 20, commonly referred to as starting injector.

The aforesaid starting injector 20 is usually fed with pressurized fuel taken from a fuel tank 38 of the aircraft by a regulating circuit including at least one pump 40 and a controlled valve 42.

The electric power module 32 of the ignition plug 24 generally includes one or more batteries as well as a voltage transformer to apply a high voltage to the electrodes of the plug 24.

Such an electric power module however has a great overall size which is desirable to reduce, in particular in the case of engines of relatively reduced size planes, such as engines intended to equip business planes.

Furthermore, the electric power modules contribute to the failure risk of ignition plugs.

DISCLOSURE OF THE INVENTION

One object of the invention is in particular to provide a simple, economic and efficient solution to these problems.

To that end, it proposes an ignition device for a turbomachine combustion chamber, comprising at least two electrodes forming an ignition plug, and a module for electrically powering these electrodes.

According to the invention, the electric power module includes a piezoelectric element electrically connected to the aforesaid electrodes, and means for intermittently applying a force onto the piezoelectric element so as to induce between these electrodes an electric voltage sufficient to cause an electric arc between these electrodes, these means comprising:

a fluid flow chamber, including at least two ports intended to the connection of the chamber to a circuit for flowing a pressurized fluid and forming at least one intake port and at least one exhaust port respectively for said fluid;

a valve for sealing the intake port;

a piston bounding the aforesaid chamber and displaceable along two opposite directions respectively corresponding to an increase and a decrease in the volume of said chamber;

elastic means biasing the piston in said direction of decrease in the volume of the chamber, and acting onto the piezoelectric element; and means for controlling the valve, configured so as to:

close the valve when the piston reaches a first predetermined position by displacing in said direction of increase in the volume of the chamber under the pressure of a fluid taken in the chamber by the intake port, thus compressing the elastic means such that the same apply said force onto the piezoelectric element, and open the valve when the piston goes beyond a second predetermined position by displacing in said direction of decrease in the volume of the chamber under the pressure of the elastic means, thus inducing a fluid ejection out of the chamber through the exhaust port.

The electric power module of the device according to the invention thus enables electric energy to be provided to the electrodes forming the ignition plug by using the piezoelectric effect to convert into an electric energy the mechanical energy conveyed by a fluid.

It should be noted that the fluid and its circuit are not strictly speaking part of the ignition device in the terminology of the present invention, but they make up the mechanical energy source to which the device is intended to be connected for the operation thereof.

More precisely, when the electric power module is connected to a circuit for flowing a fluid under a sufficient pressure, through the intake and exhaust ports of the chamber of this module, the piston spontaneously starts up oscillations caused by alternate openings and closures of the valve for sealing the intake port which are induced by the aforesaid control means of this valve. Such oscillations result in alternate compressions and expansions of the elastic means, which thus intermittently apply a force onto the piezoelectric element.

Indeed, the intake of fluid induces a displacement of the piston tending to increase the volume of the chamber and compress the elastic means. When the piston reaches its first predetermined position, the control means of the valve induce a closure thereof. Soon after wards, since the fluid pressure is no longer sufficient to balance the force exerted onto the piston by the elastic means, the piston starts up a displacement in the opposite direction and then reduces the volume of the chamber, under the effect of an expansion of the elastic means. The decrease in the volume of the chamber causes the ejection, through the exhaust port of the chamber, of part of the fluid contained in this chamber. When the piston has gone beyond the aforesaid second position, the control means of the valve induce an aperture thereof. Soon after wards, the force exerted onto the piston by the elastic means becomes low enough with respect to the intake pressure of the fluid, and then the piston goes back in the reverse direction. Therefore, the piston is alternately reciprocated.

The fluid and its circuit have of course an influence on the operation of the ignition device, in particular on the frequency of the piston oscillations. Indeed, this oscillation frequency depends in particular on the density of this fluid.

The fluid flow chamber may only include two ports for the fluid, thus forming a single intake port and a single exhaust port.

Alternatively, this fluid flow chamber can include more than two ports, thus comprising several intake ports and/or several exhaust ports.

It should be noted that the first and second predetermined positions of the piston are preferably the same.

In this manner, the frequency of the piston oscillations can be relatively high, and reaches for example a few tens Hertz.

In this case indeed, the valve is open again as soon as the piston starts up its displacement in the direction of decrease in the volume of the chamber, such that the duration and length of this displacement are minimum.

Alternatively, both predetermined positions of the piston can be spaced apart from each other when it is desirable to reduce the frequency of the piston oscillations.

In this case indeed, the valve is held closed when the piston travels the distance separating its two predetermined positions.

On the other hand, the aforesaid fluid flow circuit can be a closed circuit, for example an oil circuit, but is preferably an open circuit, in particular a fuel circuit, as will be more clearly apparent in the following.

Furthermore, the elastic means preferably comprise a compression spring.

Such a spring has the advantage of being simple to implement.

Alternatively, the elastic means can comprise a closed volume of a gas, also referred to as gas spring.

Elastic means of this type have the advantage of a very low wear over time. Of course, the gas should be selected to have a sufficient compressibility to allow piston oscillations as described above.

Furthermore, the ignition device preferably comprises an elongate shaped body intended to penetrate at least partly a combustion chamber or to be flush with an external wall thereof, this body bounding a space wherein an inner electrode of the plug extends remote to this body, which body forms an external electrode of the plug.

Advantageously, a sheath made of an electric insulating material, for example of the ceramic type, is accommodated in the aforesaid space so as to mutually insulate both electrodes of the plug.

The device can comprise means for mounting on an outer case of the combustion chamber, these means having for example the form of a plate. It is reminded that by outer case of combustion chamber, it is meant a case bounding an enclosure wherein the combustion chamber is accommodated.

The device can thus be mounted on an outer case of the combustion chamber in a manner similar to the way conventional ignition plugs are mounted.

On the other hand, the valve for sealing the aforesaid intake port can be an electrically controlled valve, but is preferably a mechanically controlled valve, as will be more clearly apparent in the following.

In a preferred embodiment of the invention, said valve includes a sealing element which is mechanically connected to the piston through the control means of the valve, and which is displaceable between a position for sealing the intake port and a position for opening this intake port, under the effect of the displacement of said piston.

The valve is thus a mechanically controlled valve, such that the electric power module requires no external feed of electric energy to operate. This type of valve further has the advantage of being of a great simplicity and particularly reliable.

The control means of the valve preferably comprise a rod having a first end integral with the piston and a second opposite end carrying the sealing element of the valve.

This sealing element thus displaces along the same direction of the piston. The link of the sealing element of the valve to the piston through such a rod has the advantage of being simple and reliable.

The sealing element of the valve is for example a flap which is applied on a seat of the valve, in a position for sealing the intake port, and which is moved away from the aforesaid seat, into a position for opening the intake port. In this case, the sealing element forms, in the position for sealing the intake port, an element for translationally retaining the piston.

Alternatively, the sealing element can have the form of a sealing piston slidably tightly mounted in a vent opening into the fluid flow chamber and having at least one side aperture opening outside said chamber and forming said intake port, the sealing element being, in the sealing position, provided facing said side aperture so as to tightly seal the same, and being, in its opening position, offset from said side aperture along the sliding direction of the sealing element so as to allow for a fluid intake through the aforesaid side aperture. In this case, the sealing element does not retain the piston of the device when this element is in its sealing position, such that the movement of the movable assembly comprising the piston and the sealing element is wholly determined by the properties of the elastic means, fluid, piston, and fluid flow chamber.

Generally, the electric power module of the device advantageously comprises a casing bounding the fluid flow chamber and wherein the piston is slidably mounted.

In particular, in the preferred embodiment of the invention, the electric power module comprises a casing which bounds said fluid flow chamber and:
  wherein the piezoelectric element is accommodated,
  wherein the piston is slidably mounted, between said chamber which it bounds and the piezoelectric element;
  wherein the elastic means are accommodated, by being sandwiched between the piston and the piezoelectric element.

This configuration has the advantage of a remarkable compactness and a design simplicity reflected also by a good overall reliability, in particular because the piston, the piezoelectric element and the elastic means can thus be aligned along the sliding direction of the piston.

Alternatively, the piezoelectric element may be not provided in line with the piston along the sliding direction of the same, and be for example provided outside the structure in which this piston is slidably mounted.

In this case, the elastic means are not directly sandwiched between the piston and the piezoelectric element, but can act on both elements through a more complex mechanism. Depending on the arrangement of the piezoelectric element, it can then be advantageous that the elastic means apply to this piezoelectric element a force having an opposite direction to that of the force applied by the piston onto these elastic means. In this case, the aforesaid mechanism may for example comprise a lever and two compression springs pressing on both ends of the lever respectively, one biasing the piston and the other acting on the piezoelectric element.

Further alternatively, the piezoelectric element may form said piston.

In this case, the elastic means may for example be sandwiched between the piezoelectric element slidably mounted in the aforesaid casing and a bottom of this casing being electrically connected to the internal electrode of the plug whereas a side wall of the casing is electrically connected to the external electrode of the plug and is electrically insulated from the aforesaid bottom of the casing. In such an exemplary embodiment, the electric link between the sliding piezoelectric element and the internal electrode of the plug can be ensured by the elastic means themselves, or by a flexible electric wire.

In a preferred embodiment of the invention, the device further comprises at least one fuel injector connected to the exhaust port of the fluid flow chamber.

In this case, the device is designed to be connected to an open fuel fluid flow circuit of which the aforesaid injector is part. More precisely, it is therefore provided that the intake port of the fluid flow chamber of the device be connected to pressurized fuel feed means.

The fuel injector is preferably configured so as to deliver a fuel sheet bathing the electrodes forming the ignition plug of the device.

Furthermore, the device preferably includes a plenum chamber connected at the input thereof to the exhaust port of the flow chamber and connected at the output thereof to the aforesaid fuel injector, to mitigate jerks in the fuel flow from the exhaust port because of the piston oscillations and thus allow a substantially steady fuel flow within the injector.

In the preferred embodiment of the invention, the aforesaid electrodes, electric power module and injector are accommodated in a same body of the device.

The invention thus enables a starting injector and an associated plug to be gathered within a common structure.

The device thus is of a particular reduced overall bulk, while offering a great assembly/disassembly simplicity.

The aforesaid body preferably includes a first elongate shaped part intended to at least partly penetrate in the combustion chamber and intended to respectively form and accommodate both electrodes, such as described above, as well as a second cylinder shaped part, intended to remain outside the combustion chamber.

The first part of the body advantageously integrates a channel which opens at an end of the body provided for forming electric arcs between the aforesaid electrodes, and which forms said injector.

As regards the second part of the body, it advantageously bounds a housing for the piezoelectric element, elastic means and piston of the device.

Alternatively, the injector of the device may be dissociated from the plug of the device.

The injector may for example be a conventional injector intended to be mounted in a bottom of a combustion chamber, away from a body of the device accommodating the electrodes forming the plug as well as the electric power module, this body being as for it intended to be mounted on an outer case of the combustion chamber in the manner described above.

In this case, the device may include conduits for fluidly communicating the injector with the fluid flow chamber of the device, and the injector may preferably be provided so as to deliver a fuel sheet bathing the electrodes forming the plug of the device.

The invention also relates to a turbomachine combustion chamber, comprising at least an ignition device of the type described above.

The invention further relates to a turbomachine, such as an aircraft turbojet engine or turboprop engine, comprising a combustion chamber of the type described above as well as controlled means for feeding a pressurized fluid which are connected to said intake port of the fluid flow chamber of the ignition device of this combustion chamber.

As explained above, the fluid can be any type of fluid, in particular lubrication oil, and preferably fuel.

In the preferred embodiment of the invention, said fluid is a fuel and the ignition device of the combustion chamber is of the type comprising a fuel injector connected to said exhaust port of the fluid flow chamber, as described above.

The invention thus enables to take advantage of the pressure of fuel feeding a starting injector to generate the electric energy necessary for the operation of the ignition plug associated with this injector.

The invention also relates to a method for igniting a combustion chamber in a turbomachine of the type described above, wherein said means for feeding a pressurized fluid are activated so as to cause within the ignition device of the combustion chamber alternately:

an intake phase of said fluid into said fluid flow chamber through said intake port, during which said piston compresses said elastic means under the pressure of the fluid such that said elastic means apply onto said piezoelectric element a force sufficient for the latter to induce between said electrodes forming the plug an electric voltage enabling an electric arc to be generated, until the piston reaches said first predetermined position such that said control means cause a closure of the valve for sealing said intake port, and an exhaust phase of said fluid during which said elastic means extend and push back the piston so as to induce a fluid ejection out of said fluid flow chamber through said exhaust port, and such that said control means cause an opening of said valve.

In the preferred embodiment of the invention, the turbomachine is of the type described above wherein said fluid is a fuel and wherein the ignition device of the combustion chamber is of the type comprising a fuel injector connected to said exhaust port of the fluid flow chamber of the device, and said exhaust phase comprises feeding the injector by the fuel from the fluid flow chamber.

BRIEF DESCRIPTION OF THE DRAWINGS

The invention will be better understood, and further details, advantages and characteristics of the same will appear upon reading the following description made by way of non-limiting example and in reference to the appended drawings wherein.

In all the figures, identical references can designate identical or analogous elements.

DETAILED DISCLOSURE OF PREFERRED EMBODIMENTS

Figure 2:
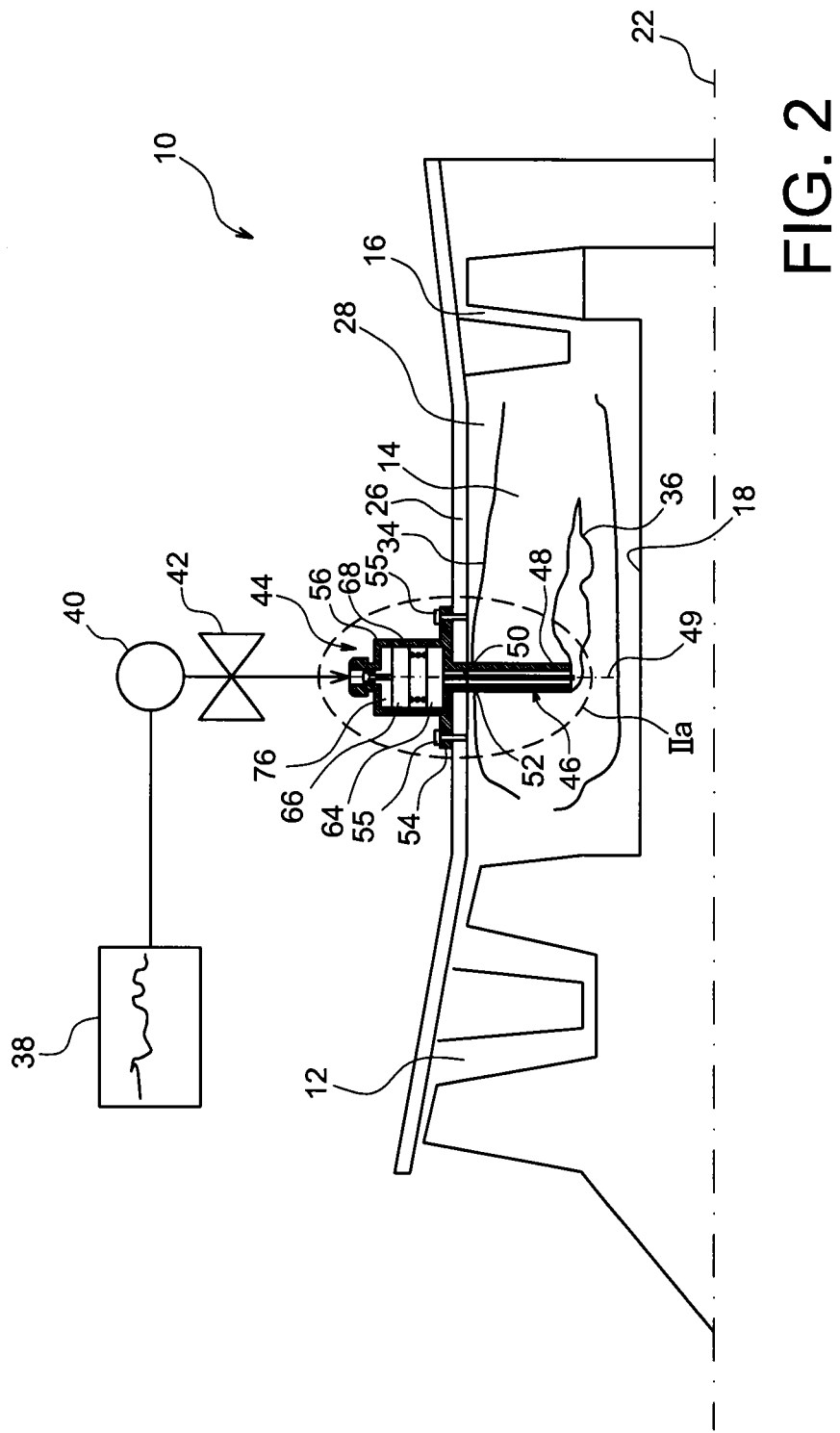
FIG. 2 is a cross-section axial partial schematic half-view of an aircraft turbomachine comprising an ignition device according to a first preferred embodiment of the invention.
Figure 2A:
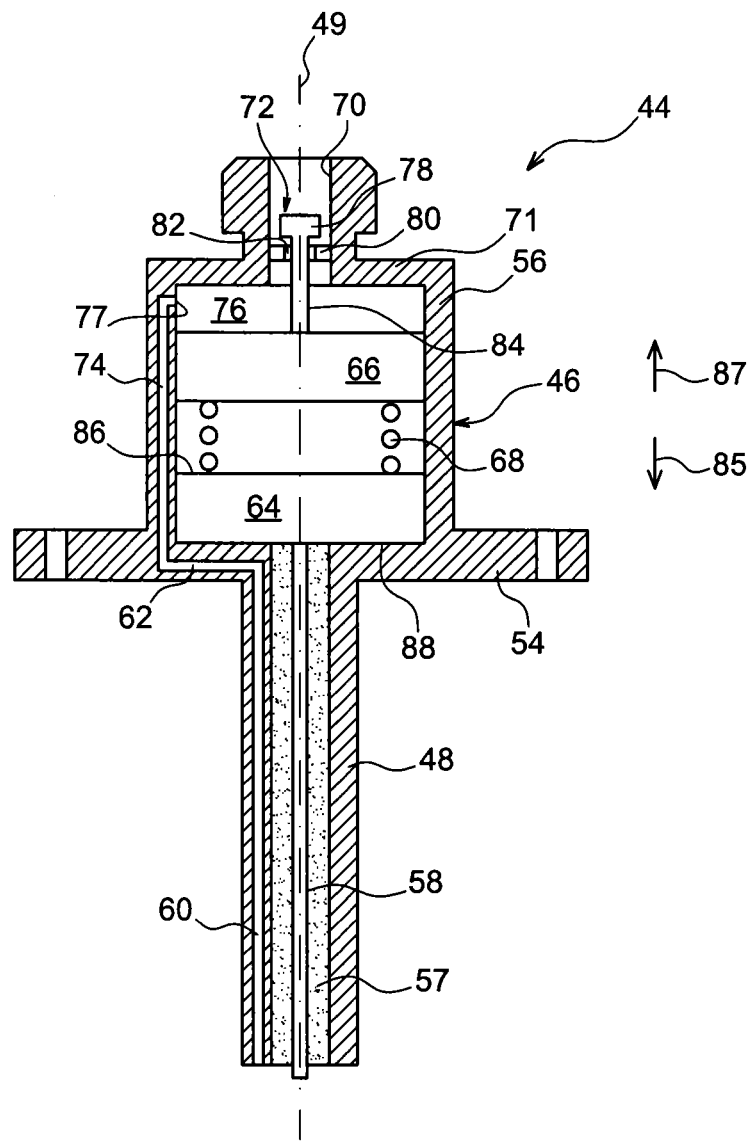
FIG. 2a is a view in a greater scale of the detail IIa of FIG. 2, illustrating the ignition device of the turbomachine.

FIGS. 2 and 2a illustrate a turbomachine, for example an airplane turbojet engine, comprising an ignition device 44 of its annular combustion chamber 14 according to a first embodiment of the invention.

In the following, the axial and radial directions are defined with respect to the longitudinal axis 22 of the turbomachine.

The ignition device 44 includes a body 46 integrating an ignition plug, a module for electrically powering this plug, as well as a starting injector, as will be more clearly apparent in the following.

The body 46 comprises a cylinder shaped elongated first part 48, having for example a revolution symmetry about an axis 49, and which extends through a port 50 of the outer case 26 of the combustion chamber and a port 52 of the outer wall 34 of this combustion chamber.

The body 46 further comprises a plate 54 connected to a radially outer end of the aforesaid first part 48 and enabling this body 46 to be attached to an external surface of the outer case 26 of the combustion chamber, by means of attaching screws 55.

Moreover, the body 46 includes a cylinder shaped second part 56, having possibly the revolution symmetry, and extending radially outwardly from the plate 54.

The first part 48 of the body 46 is made of an electric conducting material, and forms an external electrode of the plug of the device. This first part 48 of the body 46 surrounds an insulating sheath 57 which is for example made of a ceramic material and in the centre of which an internal electrode 58 of the plug extends. This insulating sheath 57 provides an electric insulation as well as a tight barrier function. The internal electrode 58 extends parallel to the axis 49 and projects beyond the radially inner end of the first part 48 of the body 46.

Moreover, the first part 48 of the body 46 integrates a channel 60 provided inside the wall of the body 46 and extending parallel to the aforesaid axis 49, and thus parallel to the internal electrode 58. This channel 60 opens at the radially inner end of the first part 48 of the body 46 and forms a fuel injector also referred to as starting injector, as will be more clearly apparent in the following.

The plate 54 integrates a channel 62 communicating with the channel 60 of the first part 48 of the body 46.

The second part 56 of the body 46 forms a casing bounding a housing for the electric power module of the device.

This electric power module comprises a disk shaped piezoelectric element 64 accommodated in a radially inner bottom of the aforesaid housing, a piston 66 also disk shaped slidably mounted in a median part of this housing, and a coil spring 68 sandwiched between the piezoelectric element 64 and the piston 66 and forming elastic means according to the terminology of the present invention.

Moreover, the second part 56 of the body 46 includes a fuel intake conduit 70 provided in a radially outer head wall 71 of this second part 56 and equipped with a flap valve 72.

The second part 56 of the body 46 further comprises a channel 74 provided in a side wall of this second part 56 and communicating on the one hand with the channel 62 provided in the plate 54, and on the other hand with the fluid flow chamber 76 into which the intake conduit 70 opens. This fluid flow chamber 76 is provided inside the housing bounded by the second part 56 of the body 46, radially outwardly with respect to the piston 66 which bounds this chamber 76. The channel 74 is connected to the fluid flow chamber 76 by an exhaust port 77, according to the terminology of the present invention.

The valve 72 includes a flap 78 and a seat 80 (FIG. 2a) consisting of an annular rib which inwardly extends as a projector in the intake conduit 70 and which bounds a fuel intake port 82. The flap 78 forms a sealing element, according to the terminology of the present invention.

The flap 78 is integral with the piston 66 through a rod 84 extending along the axis 49 of the second part 56 of the body 46 which is the same as the axis of the first part 48 of this body 46 and with respect to which the intake conduit 70 is centred, in the particular example represented in FIGS. 2 and 2a. The rod 84 is part of the control means of the valve 72, according to the terminology of the present invention.

The intake conduit 70 is connected to fuel feeding means of the turbomachine, including a shut off valve 42, a pump 40 and a fuel tank 38, which are for example of a conventional type.

The elements which make up the electric power module are dimensioned such that when the spring 68 is at rest, the flap 78 of the valve 72 is moved away from its seat 80 such that the fuel intake port 82 is open.

The ignition device 44 enables the combustion chamber 14 to be ignited according to a method which will be now described.

This ignition method starts with activating the fuel feed means connected to the intake conduit 70, especially by opening the shut off valve 42.

From then on, the fuel penetrates the flow chamber 76 through the intake port 82 and fills this chamber.

The pressure of the fuel is selected sufficiently high such that filling the flow chamber 76 with this fuel induces a displacement of the piston 66 radially inwardly, or more generally in a direction of increase in the volume of the chamber 76, shown by the arrow 85 of FIG. 2a.

Such a displacement of the piston 66 causes a compression of the spring 68 resulting in the application of an increasing force on the radially outer face 86 and inner face 88 of the piezoelectric element 64. As a result, by a piezoelectric effect, an electric voltage appears between the electrodes 48 and to which the piezoelectric element 64 is electrically connected.

During this displacement of the piston 66, fuel can also flow through the exhaust port 77 in the channel 74 and then in the channels 62 and 60 which form together the injector of the device.

The displacement of the piston 66 continues until the flap 78 of the valve 72 abuts against its seat 80 and, from then on, retains the piston 66, which piston then occupies a first predetermined position, according to the terminology of the invention.

The device is designed such that the voltage between the electrodes 48 and 58 reaches the breakdown voltage of the medium present between these electrodes such that an electric arc occurs before the flap 78 reaches its seat 80.

Then, since the fuel intake is interrupted, the spring 68 initiates an expansion causing a displacement of the piston 66 radially outwardly, or more generally in a direction of decrease in the volume of the fluid flow chamber 76, shown by the arrow 87 of FIG. 2a, from said first position which is herein the same as the second predetermined position such as defined above.

Such a displacement of the piston 66 causes the ejection of part of the fuel contained in the fluid flow chamber 76 through the exhaust port 77, up to the injector of the device formed by the channels 74, 62 and 60.

Moreover, the piston 66 drives the flap 78 of the valve 72 during its displacement and thus induces the opening of this valve 72, making fuel intake again possible into the fluid flow chamber 76.

Therefore, there occur alternate intake and exhaust phases of fuel resulting in oscillations of the piston 66, each oscillation giving rise to an electric arc between the electrodes 48 and 58 of the device.

The length of the path traveled by the fuel within the channels 74, 62 and 60 forming the injector device enables the fuel flow rate to be smoothed at the output of this injector. This smoothing is all the more marked when the device, by its sizing, promotes a flow of some amount of fuel from the fluid flow chamber 76 to the injector during the intake phase.

When this is of interest, the device can further include a plenum chamber provided on the fuel path between the fluid flow chamber 76 and the output of the injector of the device, in order to further improve the fuel flow rate evenness at the output of the injector.

Of course, the device 44 of FIGS. 2 and 2a is only an illustrative example selected form different possibilities of configurations of the present invention.

Thus, as explained above, the elastic means 68 can be of a different type, for example of the gas spring type.

Moreover, the relative arrangement between the piston 66 and the piezoelectric element 64 can be different. In particular, the piezoelectric element can itself form the piston when this is of interest.

Figure 1:
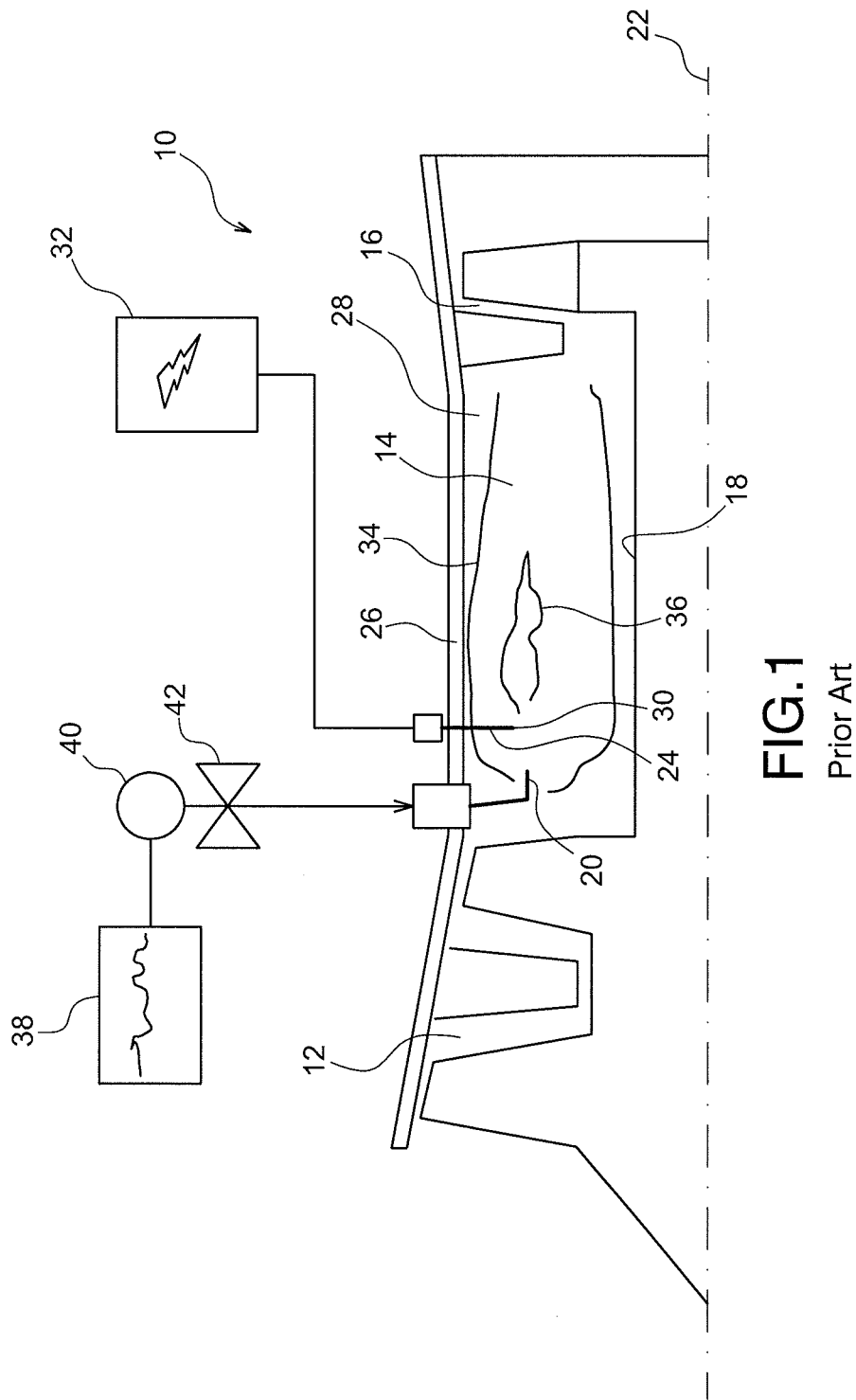
FIG. 1, already described, is a cross-section axial partial schematic half-view of an aircraft turbomachine of a known type.

On the other hand, the injector of the device 44 can be formed outside the body 46, and thus be dissociated from the plug of the device. In this case, the injector can for example be of the same type as the injector 20 of FIG. 1, while being fed with fuel from the exhaust port 77 of the device using suitable conduits.

Furthermore, the valve 72 can be of the different type from the one described above.

Figure 3:
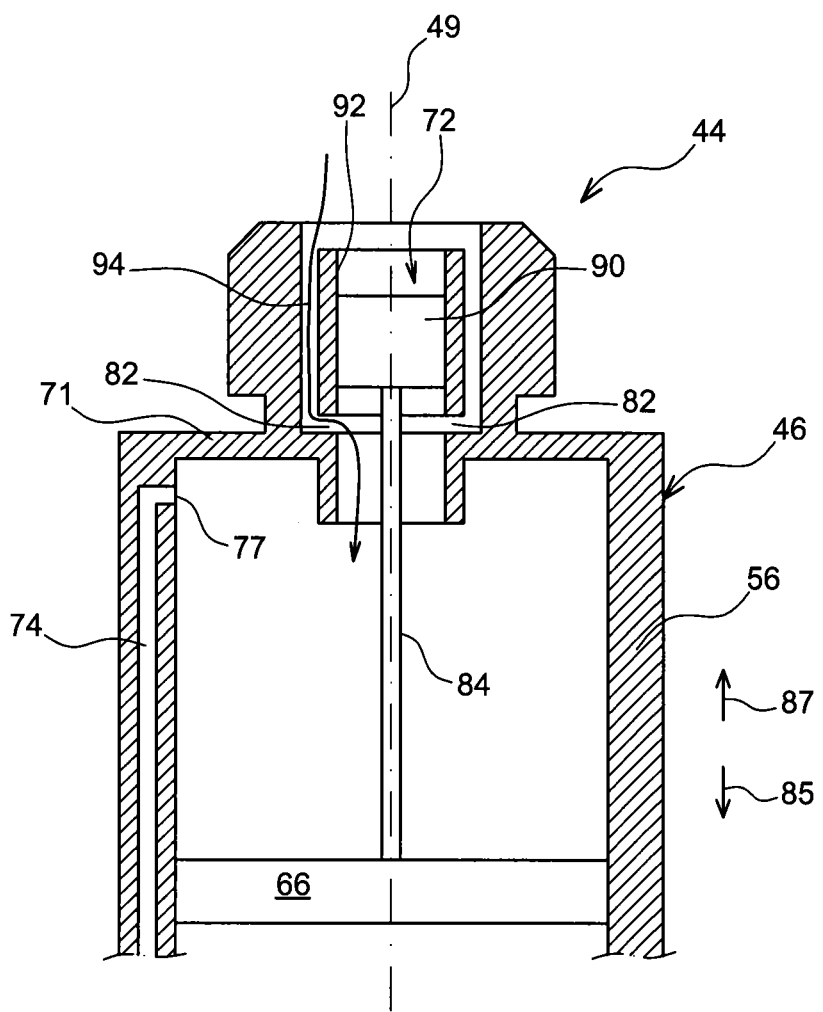
FIG. 3 is a cross-section axial partial schematic view of an ignition device according to a second preferred embodiment of the invention.

FIG. 3 thus describes an ignition device 44 for an annular combustion chamber 14 of an aircraft turbomachine according to a second preferred embodiment of the invention, which is generally similar to the device described above but wherein the sealing element of the valve 72 takes the form of a sealing piston 90 tightly slidably mounted in a vent 92 integral with the body 46 of the device.

The aforesaid vent 92 opens into the fluid flow chamber 76 and has a plurality of intake ports 82 distributed around the axis 49 of the body 46 corresponding to a sliding axis of the sealing piston 90.

The sealing piston 90 is displaceable between a position for opening the intake ports 82 such as represented in FIG. 3, wherein this sealing piston 90 is offset from these ports 82 along the direction of its sliding axis 49 so as to allow a fluid flow 94 through these ports 82, and a position for sealing the intake ports 82, wherein the sealing piston 90 is provided facing these ports 82 so as to prevent any fluid flow through these ports.

In this second embodiment of the invention, the piston 66 of the device 44 can continue its displacement in the direction of increase in the volume of the fluid flow chamber 76 even when the valve 72 is closed, without this piston 66 being retained by the sealing element 90 of the valve 72.

Because of the absence of a stop forming element against the movable assembly comprising the piston 66, the oscillations of this piston 66 can be highly even.

It should be noted that the movement of this movable assembly is then substantially determined by the stiffness of the elastic means 68, the mass of this movable assembly and the fluid pressure, as well as the frictions induced during the movement of this movable assembly.

Other configurations of the valve 72 are of course possible without departing from the scope of the present invention.

Generally, the ignition device 44 according to the invention has the advantage of not requiring external electric power as is the case with ignition devices known from prior art, which allows in particular the device according to the invention to offer a dramatically improved reliability.

Moreover, this ignition device can have a notably reduced overall bulk, and is therefore particularly advantageous to equip airplane engines having a relatively reduced size, such as engines intended to equip business planes.

The invention claimed is:

1. An ignition device for a turbomachine combustion chamber, comprising:
    two electrodes forming an ignition plug; and
    an electric power module for electrically powering the electrodes, wherein the electric power module includes a piezoelectric element electrically connected to the electrodes and means for intermittently applying a force to the piezoelectric element to generate between the electrodes an electric voltage sufficient to cause an electric arc therebetween,
    the means for intermittently applying a force comprising:
    a fluid flow chamber, including at least two ports for connecting the fluid flow chamber to a circuit for flowing a pressurized fluid, the at least two ports forming respectively at least one intake port and at least one exhaust port for the fluid;
    a valve for sealing the intake port;
    a piston bounding the chamber and displaceable along two opposite directions corresponding to an increase and a decrease in volume of the chamber respectively;
    elastic means biasing the piston into the direction of decrease in volume of the chamber, and acting on the piezoelectric element; and
    means for controlling the valve, configured to close the valve when the piston, displacing in the direction of increase in the volume of the chamber under pressure of a fluid taken in the chamber by the intake port, and thus compressing the elastic means such that the elastic means applies a force onto the piezoelectric element, reaches a first predetermined position, and to open the valve when the piston, displacing in the direction of decrease in the volume of the chamber under pressure of the elastic means and thus inducing a fluid ejection out of the chamber through the exhaust port, goes beyond a second predetermined position.

2. The device according to claim 1, wherein the valve includes a sealing element which is mechanically connected to the piston by the means for controlling the valve, and which is displaceable between a position for sealing the intake port and a position for opening the intake port under effect of the displacement of the piston.

3. The device according to claim 1, wherein the electric power module comprises a casing which bounds the fluid flow chamber and in which:
- the piezoelectric element is accommodated;
- the piston is slidably mounted, between the chamber and the piezoelectric element; and
- the elastic means is accommodated, by being sandwiched between the piston and the piezoelectric element.

4. The device according to claim 1, further comprising at least one fuel injector connected to the exhaust port of the fluid flow chamber.

5. The device according to claim 4, wherein the electrodes, the electric power module, and the fuel injector are accommodated in a same body of the device.

6. A combustion chamber for a turbomachine, comprising at least one ignition device according to claim 1.

7. A turbomachine, or an aircraft turbojet engine, or turboprop engine, comprising:
- a combustion chamber according to claim 6; and
- control means for feeding a pressurized fluid which is connected to the intake port of the fluid flow chamber of the ignition device of the combustion chamber.

8. The turbomachine according to claim 7, wherein the fluid is a fuel and the ignition device of the combustion chamber comprises at least one fuel injector connected to the exhaust port of the fluid flow chamber.

9. A method for igniting a combustion chamber in a turbomachine according to claim 7, wherein the means for feeding a pressurized fluid are activated so as to cause alternately:
- an intake phase of the fluid into the fluid flow chamber through the intake port, during which the piston compresses the elastic means under pressure of the fluid such that the elastic means applies onto the piezoelectric element a force sufficient for the piezoelectric element to induce between the electrodes an electric voltage enabling an electric arc to be generated, until the piston reaches the first predetermined position such that the control means causes a closure of the valve for sealing the intake port; and
- an exhaust phase of the fluid during which the elastic means extends and pushes back the piston to induce a fluid ejection out of the fluid flow chamber through the exhaust port, and such that the control means causes an opening of the valve.

10. The method according to claim 9, wherein the fluid is a fuel and the ignition device of the combustion chamber comprises at least one fuel injector connected to the exhaust port of the fluid flow chamber, and the exhaust phase comprises supplying the injector with the fuel from the fluid flow chamber.

* * * * *